United States Patent Office 2,910,490
Patented Oct. 27, 1959

2,910,490

PROCESS FOR PREPARING GLYCOL MONO-ESTERS OF ORGANIC CARBOXYLIC ACIDS

John David Malkemus, Austin, Tex., assignor to Jefferson Chemical Company, Inc., Houston, Tex., a corporation of Delaware No Drawing. Application October 16, 1956
Serial No. 616,134

20 Claims. (Cl. 260—410.6)

This invention relates to esters of organic acids and, more particularly, to a process for preparing glycol monoesters of organic acids.

In accordance with this invention, a process is provided whereby an organic acid is reacted with an alkylene oxide in the presence of an ammonium halide catalyst which specifically promotes the formation of a monoester while suppressing the formation of polyesters.

Heretofore, glycol esters of organic acids have been prepared by several methods. According to one commonly employed method, an organic acid is reacted with an alkylene glycol. In this process, a substantial excess of glycol is employed in order to minimize the formation of diester by-products. The disadvantage of this process is that the glycol monoester product must be recovered from large amounts of unreacted glycol, which is both troublesome and costly. Glycol esters have also been prepared by reacting alkylene oxide with an organic acid in the presence of a reaction promoter, such as sodium hydroxide or sulfuric acid. The use of such promoters has not provided commercially attractive processes because of the fact that they also promote undesirable side reactions in addition to the main reaction. Thus, reactions employing the base have resulted in a product containing 25% or more of undesired diester, while reactions employing the acid have resulted in extensive polymerization of the alkylene oxide leaving a substantial amount of the organic acid unreacted.

It has now been discovered that a particular class of catalytic materials provide an efficient method whereby upwards of 95% of the reactants may be converted into the desired glycol monoester product while the formation of polyesters is substantially suppressed. The class of catalysts which give this improvement are the halide salts and halide salt derivatives of ammonium hydroxide, or more specifically, the simple and substituted ammonium halides. These halides may also be defined as basic nitrogen compounds represented by the formula:

(a) 

in which X is an ion from the group consisting of chloride, bromide, fluoride, and iodide, and $R_1$, $R_2$, $R_3$, and $R_4$ are each selected from the group consisting of hydrogen and hydrocarbon radicals from the group consisting of (1) alkyl containing from 1 to 20 carbon atoms, (2) lower alkenyl, (3) phenyl, (4) naphthyl, (5) alkylphenyl in which the alkyl group contains from 1 to 4 carbon atoms, and (6) phenyl-substituted alkyl radicals in which the alkyl group contains from 1 to 4 carbon atoms, and (b) Compounds having the above noted formula in which $R_1$ and $R_2$ have the values above, and in which $R_3$ and $R_4$ are interconnected to form with the basic nitrogen atom a heterocyclic ring selected from the group consisting of the pyridine, piperidine, pyrrolidine, pyrroline, morpholine, and thiomorpholine series.

This process may be employed to prepare the glycol monoesters of organic acids having 6 to about 24 carbon atoms and having at least one free carboxyl group. It is to be understood that the glycol monoesters of polybasic organic acids can also be prepared by the same process. Both the simple acids and natural or synthetic mixtures thereof (as in tall oil) can be employed. The organic acids which may be used include normal and branch-chain, saturated and unsaturated, monobasic and polybasic, aliphatic and aromatic acids. These organic acids are well known as carboxylic acids. Representative acids include lauric acid, stearic acid, caprylic acid, palmitic acid, benzoic acid, salicyclic acid, adipic acid, azelaic acid, linoleic acid, arachidic acid, oleic acid, toluic acid, phthalic acid, 2-ethyl caprylic acid, and 2,4-dimethyl caprylic acid. The process is particularly well adapted to the preparation of glycol monoesters of fatty acids having from 12 to 18 carbon atoms. The fatty acid esters so prepared are especially useful as surface active agents and are also valuable as chemical intermediates for preparing higher molecular weight surface active agents.

Alkylene oxides which may be employed in this process are the 1,2- and 1,3-alkylene oxides. A preferred group within this class is the lower alkylene oxides having from 2 to about 8 carbon atoms in the hydrocarbon chain. Representative alkylene oxides include ethylene oxide, propylene-1, 2 oxide, butylene-1, 2 oxide, butylene-1, 3 oxide, glycidol, isobutylene oxide, butadiene monoxide, styrene oxide, diisobutylene oxide, and epichlorohydrin.

Specific examples of the ammonium halide catalysts, described hereinabove and which may be employed in this process, include ammonium chloride, ammonium bromide, ammonium fluoride, ammonium iodide, tetramethylammonium bromide, tetraethylammonium bromide, tetraethylammonium chloride, tetramethylammonium iodide, methyl triethyl ammonium fluoride, tetraethylammonium iodide, aniline hydrobromide, triethylammonium bromide, phenyl trimethylammonium iodide, cetyl pyridinium bromide, octadecyl trimethylammonium chloride, dimethyl p-toluidine hydrochloride, pyrrolidine hydrochloride, morpholine hydrochloride, thiomorpholine hydrochloride, pyrrolidine hydrobromide, tetrabutylammonium bromide, diallyl diethylammonium bromide, naphthyl trimethylammonium chloride, tolyl trimethylammonium bromide, and benzyl trimethylammonium iodide. In general, the hydrocarbon substituted ammonium halides, such as the quaternary ammonium halides, are the preferred catalysts although oxygen, nitrogen, and sulfur containing derivatives, such as the morpholine and thiomorpholine derivatives, may also be employed.

The amount of the ammonium halide catalyst employed in this process is not critical. Minor amounts have been found to be entirely suitable. Normally, an amount between about 0.1% to 5% by weight based on the organic acid is employed although the preferred amount is from about 1 to 3%.

While alkylene oxide and the organic acid may be reacted at ordinary pressures, pressures moderately above atmospheric pressure in the range from about 2 to 5 atmospheres are preferred. The reaction may be conducted at a temperature between 75 and 175° C. Temperatures above 175° C. are operable, but are less desirable since temperatures above this tend to decrease the proportion of monoester in the product. In practice, a temperature in the range of 100° to 140° C. will be employed.

Under the above stated conditions for this reaction, the alkylene oxide may be present in substantial excess over the stoichiometric amount for monoester formation without causing the formation of appreciable amounts of polyglycol esters.

The following examples illustrate the practice of this invention:

EXAMPLE 1

347 grams (1.29 mols) of double-pressed stearic acid and 3.0 grams of tetraethylammonium bromide were introduced into a pressure type reaction vessel having a capacity of 700 milliliters. This vessel had an electric heating jacket and was mounted on a shaker platform. The vessel was flushed with nitrogen, evacuated, and then heated to 119° C. Liquid ethylene oxide was forced into the vessel until the pressure within amounted to 40 p.s.i.g. (pounds per square inch gauge). This pressure was maintained during the reaction by adding additional ethylene oxide as required. The temperature was maintained between 120° and 130° C.

The product of this reaction was an almost white solid having an acid number of 2.98 which is equivalent to only 1.4% of free stearic acid. The hydroxyl and saponification numbers of the product corrected for acid, were, respectively, 167 and 172 milligrams of KOH per gram. Extraction of a portion of this product which removed by-product glycol gave corrected hydroxyl and saponification numbers of 156 and 170 respectively. The composition of the crude product obtained before extraction was calculated to be:

|  | Percent |
|---|---|
| Ethylene glycol monostearate | 89.1 |
| Ethylene glycol distearate | 9.0 |
| Ethylene glycol | 0.5 |
| Stearic acid | 1.4 |

The following Examples 2–4 illustrate the prior art, and emphasize the improvement in monoester yield provided by this invention.

EXAMPLE 2

473 grams (1.75 mols) of double-pressed stearic acid and 77 grams (1.75 mols) of ethylene oxide were reacted in the presence of 0.5 gram (1.0%) of sodium hydroxide at a temperature between 140–150° C. at 40 p.s.i.g. in a manner similar to that described in Example 1. The product of this reaction contained:

|  | Percent |
|---|---|
| Ethylene glycol monostearate | 69.5 |
| Ethylene glycol distearate | 24.9 |
| Ethylene glycol | 1.1 |
| Stearic acid | 4.5 |

EXAMPLE 3

This example was similar to Example 1 except that no catalyst was employed and the reaction was continued for a substantially longer period of time. In spite of the longer reaction time, the reaction was incomplete. The acid number of the product was 50.1 milligrams of KOH per gram which is equivalent to 24.1% of free stearic acid.

EXAMPLE 4

This example was conducted similarly to Example 1 except that 1.7 grams of concentrated sulfuric acid were employed to catalyze the reaction. The reaction was conducted at 80° C. and at 40 pounds per square inch pressure. Although all of the ethylene oxide present in the reactor was consumed, the sulfuric acid did not promote the formation of glycol monoesters since the product contained 87% of unreacted stearic acid.

Tables I and II below give the conditions and results of a number of examples conducted in accordance with this invention.

*Table I*

| Example No. | Reactants and reaction conditions | | | | | Composition of product, weight, percent | | | |
|---|---|---|---|---|---|---|---|---|---|
| | Epoxide | Acid | Catalyst, percent | Temp., °C.; pressure, 40 p.s.i.g. | Time, hours | Acid | Glycol | Mono-ester | Diester |
| 5 | Ethylene oxide | Lauric | TEAB,[1] 1% | 125 | 1½ | 1.0 | 1.2 | 94.9 | 2.9 |
| 6 | Propylene oxide | Stearic | TEAB, 0.9% | 120–125 | 2¼ | 6.1 | 0.1 | 93.1 | 0.7 |
| 7 | ----do---- | Lauric | TEAB, 1% | 125–130 | 2 | 0.1 | 2.8 | 79.8 | 17.3 |
| 8 | Glycidol | Stearic | TEAB, 1% | [2] 110–115 | 4 | 5.8 | 0.7 | 88.7 | 4.8 |
| 9 | Ethylene oxide | Lauric | TEAB, 0.25% | 125–130 | 4½ | 2.2 | 0.5 | 85.6 | 11.7 |
| 10 | ----do---- | ----do---- | TEAB, 1% | 100 | 6 | 4.3 | 0.2 | 92.2 | 3.3 |
| 11 | ----do---- | Tall oil [3] | TEAB, 1% | 125 | 2½ | 8.5 | 0.2 | 89.3 | 2.0 |
| 12 | ----do---- | Lauric | TEAB, 1% | [4] 125–135 | 1¼ | 0.8 | 1.2 | 92.5 | 5.5 |

[1] Tetraethylammonium bromide.
[2] Atmospheric pressure.
[3] Contains rosin and fatty acids.
[4] 20 p.s.i.g.

*Table II.—The effect of other ammonium halide catalysts on the ethylene oxide-acid reaction*

| Example No. | Reaction conditions [1] | | | | Composition of product, weight percent | | | |
|---|---|---|---|---|---|---|---|---|
| | Acid | Catalyst, percent | Temp., °C.; 40 p.s.i.g. | Time, hours | Acid | Glycol | Mono-ester | Di-ester |
| 13 | Lauric | Hyamine 1622,[2] 1% | 120–125 | 3 | 7.3 | 1.4 | 82.5 | 8.8 |
| 14 | ----do---- | Tetramethylammonium chloride, 1% | 125–130 | 1½ | 5.4 | 1.0 | 85.3 | 8.3 |
| 15 | ----do---- | Trimethylphenylammonium chloride, 1% | 120 | 3½ | 4.2 | 0.4 | 85.4 | 10.0 |
| 16 | Stearic | Ammonium iodide, 1% [3] | 115–120 | 5 | 4.7 | 0.3 | 92.2 | 2.7 |
| 17 | ----do---- | Ammonium chloride, 1% | 115–125 | 6½ | 11.3 | 0.6 | 81.0 | 7.1 |
| 18 | ----do---- | Triethylamine hydrochloride, 1% | 115–120 | 2 | 5.2 | 0.2 | 88.7 | 6.0 |

[1] The equipment and procedure were the same as described in Example 1.
[2] Para-diisobutylphenoxyethoxyethyl dimethylbenzylammonium chloride.
[3] 0.2% water added as promoter.

EXAMPLE 19

This example was carried out in the same manner as Example 1. A 366 g. charge of benzoic acid was reacted with 135 g. of ethylene oxide in the presence of 3.6 g. of tetraethylammonium bromide at 115–125° C. and 40 p.s.i.g. over about one hour. The resulting ethylene glycol monobenzoate was a water-white liquid which contained only 3.7% of unconverted benzoic acid according to its acid number of 16.8 mg. KOH/g.

In developing this process, it was unexpectedly discovered that another modification still further enhanced or promoted the formation of a glycol monoester of a carboxylic acid. According to this modification, a minor amount of water is added to the reactants. The addition of water promotes the reaction at lower temperatures with the result that the reaction is more efficient resulting in higher yields. Water in an amount of about 10–50% by weight of the catalyst may be employed although it is preferred to employ between 20–30%. Example 16 in Table II and Examples 20 through 25, in Table III illustrate the advantage of employing water as a reaction promoting material. Yields in excess of 96% are readily obtained.

*Table III.—The value of water as a promoter in the ethylene oxide-acid reaction*

| Example No. | Acid | Reaction conditions | | | | Composition of product, weight percent | | | |
|---|---|---|---|---|---|---|---|---|---|
| | | Catalyst, percent | Promoter, percent | Temp., °C.; 40 p.s.i.g. | Time, hours | Acid | Glycol | Monoester | Diester |
| 20 | Stearic [1] | TEAB,[2] 0.9 | None | 125–130 | ¾ | 0 | 1.4 | 81.5 | 17.1 |
| 21 | ...do.[1] | TEAB, 0.9 | Water, 0.3 | 120–130 | ¾ | 4.7 | 0.2 | 92.5 | 2.6 |
| 22 | ...do.[3] | TEAB, 1.0 | None | 125–130 | 3½ | 3.2 | 0.4 | 87.9 | 8.5 |
| 23 | ...do.[3] | TEAB, 1.0 | Water, 0.3 | 115–120 | 1 | 3.3 | | 96.2 | 0.5 |
| 24 | Oleic | TEAB, 1.0 | None | 125–130 | 2 | 0.1 | 2.9 | 60.6 | 36.4 |
| 25 | ...do | TEAB, 1.0 | Water, 0.2 | 110 | 2 | 6.0 | 0.7 | 90.5 | 2.8 |

[1] Double-pressed stearic acid.
[2] Tetraethylammonium bromide.
[3] Triple-pressed stearic acid.

It was observed that the reaction product tended to become alkaline at times. While the reason for this is not fully understood, it is attributed to a reaction between the catalyst and the alkylene oxide. Since the products may exhibit some instability under alkaline conditions, stabilization of the reaction product was effected with gaseous carbon dioxide. This treatment had the effect of neutralizing or slightly acidifying the mixture at a pH of 7 or slightly below. It is understood, of course, that a similar effect may be produced by employing small amounts of any acid or acid-forming composition.

Obviously, many modifications and variations of the invention, as herein set forth, may be made without departing from the spirit and scope thereof, and therefore only such limitations should be imposed as are indicated in the appended claims.

I claim:

1. In a method for the preparation of a glycol monoester of an organic carboxylic acid wherein an organic carboxylic acid having from 6 to about 24 carbon atoms is reacted with an alkylene oxide at a temperature in the range from about 75° C. to about 175° C., the improvement which comprises conducting said reaction in the presence of an ammonium halide catalyst said halide being selected from the group consisting of chloride, bromide and iodide.

2. A method according to claim 1 in which said catalyst is an ammonium bromide.

3. A method according to claim 1 in which said catalyst is an ammonium chloride.

4. A method according to claim 1 in which said catalyst is an ammonium iodide.

5. A method according to claim 1 in which said catalyst amounts to about 0.1% to 5% by weight based on said acid.

6. A method according to claim 2 in which said catalyst is tetraethylammonium bromide.

7. A method according to claim 3 in which said catalyst is ammonium chloride.

8. A method according to claim 3 in which said catalyst is tetramethylammonium chloride.

9. A method according to claim 5 in which said reaction is conducted in the presence of about 10% to about 50% by weight of water based on said catalyst.

10. A method for preparing an ethylene glycol monoester of an organic monocarboxylic acid, said acid having from 6 to about 24 carbon atoms, which comprises reacting said acid with ethylene oxide at a temperature in the range from about 75° C. to about 175° C. in the presence of an ammonium halide catalyst said halide being selected from the group consisting of chloride, bromide and iodide.

11. A method for preparing a glycol monoester of a $C_{12}$–$C_{18}$ fatty acid which comprises reacting said fatty acid with a lower alkylene oxide at a temperature in the range from about 75° C. to about 175° C. in the presence of an ammonium halide catalyst said halide being selected from the group consisting of chloride, bromide and iodide.

12. A method according to claim 11 in which said oxide is ethylene oxide and said catalyst is tetraethylammonium bromide.

13. A method according to claim 11 in which said oxide is propylene 1, 2 oxide.

14. A method according to claim 11 in which said oxide is glycidol.

15. A method according to claim 1, wherein the reaction product is acidified to a pH of 7.0 to slightly below 7.0 for stabilization of the otherwise normally alkaline reaction product.

16. A method according to claim 15, wherein the acidifying is effected with gaseous $CO_2$.

17. The method of preparing a glycol monoester which comprises reacting a lower alkylene oxide with a $C_{12}$–$C_{24}$ fatty acid at 100–140° C. in the presence of 0.1–5.0% by weight of an ammonium halide catalyst (based on the weight of the fatty acid) said halide being selected from the group consisting of chloride, bromide and iodide and about 10–50% by weight of water (based on the weight of the catalyst) as a promoter.

18. The method according to claim 17, wherein the pressure is about 2–5 atmospheres and the reaction time about ¾–6½ hours.

19. A method for preparing ethylene glycol monostearate which comprises reacting ethylene oxide with stearic acid at a temperature in the range from about 100° C. to about 140° C. and in the presence of about 0.1–5.0% by weight based on said acid of tetraethylammonium bromide.

20. A method for preparing ethylene glycol monolaurate which comprises reacting ethylene oxide with lauric acid at a temperature in the range from about 100° C. to about 140° C. and in the presence of about 0.1–5.0% by weight based on said acid of tetraethylammonium bromide.

References Cited in the file of this patent

UNITED STATES PATENTS

| | | |
|---|---|---|
| 2,089,569 | Orthner et al. | Aug. 10, 1937 |
| 2,131,142 | Orthner et al. | Sept. 27, 1938 |
| 2,678,935 | Sundberg, et al. | May 18, 1954 |

FOREIGN PATENTS

| | | |
|---|---|---|
| 292,059 | Great Britain | May 31, 1928 |